United States Patent
Kim et al.

(10) Patent No.: US 11,458,808 B2
(45) Date of Patent: Oct. 4, 2022

(54) FEATURES OF SHUTTER SYSTEM USING MODULAR SMA SPRING ACTUATOR

(71) Applicant: GM GLOBAL TECHNOLOGY OPERATIONS LLC, Detroit, MI (US)

(72) Inventors: Wonhee M. Kim, Royal Oak, MI (US); Calin Tapuchievici, Markham (CA); Nicholas J. Christoff, Macomb, MI (US); Kevin P. Nguyen, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 194 days.

(21) Appl. No.: 16/855,439

(22) Filed: Apr. 22, 2020

(65) Prior Publication Data

US 2021/0331557 A1    Oct. 28, 2021

(51) Int. Cl.
  *B60H 1/00* (2006.01)
  *B60H 1/34* (2006.01)
(52) U.S. Cl.
  CPC ..... *B60H 1/00864* (2013.01); *B60H 1/00671* (2013.01); *B60H 2001/3478* (2013.01)
(58) Field of Classification Search
  None
  See application file for complete search history.

(56) References Cited

U.S. PATENT DOCUMENTS

| | | | |
|---|---|---|---|
| 4,738,116 A | * | 4/1988 | Himeno ................... F24F 11/30 62/186 |
| 6,979,050 B2 | | 12/2005 | Browne et al. |
| 6,991,280 B2 | | 1/2006 | McKnight et al. |
| 7,059,664 B2 | | 6/2006 | Aase et al. |
| 7,118,652 B2 | | 10/2006 | Mc Knight et al. |
| 7,147,269 B2 | | 12/2006 | Aase et al. |
| 7,147,271 B2 | | 12/2006 | Aase et al. |
| 7,178,859 B2 | | 2/2007 | Browne et al. |
| 7,252,313 B2 | | 8/2007 | Browne et al. |
| 7,370,894 B2 | | 5/2008 | Browne et al. |
| 7,429,074 B2 | | 9/2008 | Mc Knight et al. |
| 7,498,926 B2 | | 3/2009 | Browne et al. |
| 7,607,717 B2 | | 10/2009 | Browne et al. |
| 7,686,382 B2 | | 3/2010 | Rober et al. |

(Continued)

FOREIGN PATENT DOCUMENTS

| JP | 62073024 A | * | 4/1987 |
|---|---|---|---|
| JP | 2001020408 A | * | 1/2001 |

*Primary Examiner* — Ko-Wei Lin

(57) ABSTRACT

A shutter system for use in a vehicle. The shutter system comprises a panel mounted on a conduit through which air flows, the panel having a first plurality of apertures for permitting air to flow therethrough; and a grille movably mounted on a surface of the panel, the grille having a second plurality of apertures for permitting air to flow therethrough. In an open position, the grille is aligned with the panel such that the first and second plurality of apertures are aligned to permit air to flow through both the first and second plurality of apertures. In a closed position, the grille is aligned with the panel such that the first and second plurality of apertures are not aligned and air is blocked from flowing through the first and second plurality of apertures. The shutter system comprises a first actuator mechanism coupled to the panel and the grille and comprising a first bias spring and a first shape-memory alloy (SMA) spring. The first actuator mechanism moves the grill between the open position and the closed position.

20 Claims, 4 Drawing Sheets

(56) References Cited

U.S. PATENT DOCUMENTS

| | | | |
|---|---|---|---|
| 7,703,839 B2 | 4/2010 | McKnight et al. | |
| 7,775,582 B2 | 8/2010 | Browne et al. | |
| 7,845,709 B2 | 12/2010 | Browne et al. | |
| 7,854,467 B2 | 12/2010 | McKnight et al. | |
| 7,866,737 B2 * | 1/2011 | Browne | F24F 13/1426 296/193.1 |
| 7,900,986 B2 | 3/2011 | Browne et al. | |
| 7,905,538 B2 | 3/2011 | Ukpai et al. | |
| 7,997,632 B2 | 8/2011 | Browne et al. | |
| 8,086,352 B1 * | 12/2011 | Elliott | G05B 15/02 700/277 |
| 8,408,981 B2 * | 4/2013 | Su | F04D 27/002 454/358 |
| 8,616,613 B2 | 12/2013 | Browne et al. | |
| 8,807,166 B2 * | 8/2014 | Charnesky | B60K 11/085 137/601.08 |
| 2005/0121240 A1 * | 6/2005 | Aase | B60K 11/085 180/68.1 |
| 2009/0045042 A1 | 2/2009 | Browne et al. | |
| 2009/0047197 A1 | 2/2009 | Browne et al. | |
| 2009/0061188 A1 | 3/2009 | Browne et al. | |
| 2010/0032982 A1 | 2/2010 | Browne et al. | |
| 2011/0097985 A1 | 4/2011 | Stauffer et al. | |
| 2011/0121607 A1 | 5/2011 | Browne et al. | |
| 2012/0132474 A1 | 5/2012 | Charnesky et al. | |
| 2012/0305818 A1 * | 12/2012 | Charnesky | B60K 11/085 251/212 |
| 2015/0047860 A1 * | 2/2015 | Rutherford | A62C 2/18 169/48 |
| 2019/0390593 A1 | 12/2019 | Li et al. | |
| 2020/0033034 A1 * | 1/2020 | Jeong | B60H 1/00485 |

\* cited by examiner

FEATURES OF SHUTTER SYSTEM USING MODULAR SMA SPRING ACTUATOR

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Many mechanical systems incorporate thermal control devices that automatically adjust the temperature of the mechanical system. For example, motor vehicles and air conditioning or heating systems may include automated vents that open or close to admit more or less cooling air into the vehicle or A/C system. For example, a vehicle vent may include a shutter that opens to increase the flow of outside cooling air when the ambient temperature in the vehicle is high and that closes to decrease the flow of outside cooling air when the ambient temperature in the vehicle is low. To decrease costs and increase reliability, it is desirable to make such automated thermal control devices as simple as possible.

SUMMARY

Further areas of applicability of the present disclosure will become apparent from the detailed description, the claims and the drawings. The detailed description and specific examples are intended for purposes of illustration only and are not intended to limit the scope of the disclosure.

It is an object of the present disclosure to provide a shutter system comprising: i) a panel configured to be mounted on a conduit through which air flows, the panel having a first plurality of apertures for permitting air to flow therethrough; and ii) a grille movably mounted on a surface of the panel, the grille having a second plurality of apertures for permitting air to flow therethrough. In an open position, the grille is aligned with the panel such that the second plurality of apertures are aligned with the first plurality of apertures to permit air to flow through both the first and second plurality of apertures. In a closed position, the grille is aligned with the panel such that the second plurality of apertures are not aligned with the first plurality of apertures and air is blocked from flowing through the first and second plurality of apertures. The shutter system further comprises a first actuator mechanism coupled to the panel and the grille and comprising a first bias spring and a first shape-memory alloy (SMA) spring, the first actuator mechanism configured to move the grill between the open position and the closed position.

In one embodiment, the first bias spring and the first SMA spring are fixedly coupled to the panel.

In another embodiment, the first bias spring and the first SMA spring are movably coupled to the grille.

In still another embodiment, the first bias spring and the first SMA spring move the grille relative to the panel as the force exerted by the first SMA spring changes as ambient temperature changes.

In yet another embodiment, as the ambient temperature increases, the force exerted by the first SMA spring increases such that the first bias spring and the first SMA spring move the grille towards the open position, and as the ambient temperature decreases, the force exerted by the first SMA spring decreases such that the first bias spring and the first SMA spring move the grille towards the closed position.

In a further embodiment, as the ambient temperature decreases, the force exerted by the first SMA spring increases such that the first bias spring and the first SMA spring move the grille towards the open position, and as the ambient temperature increases, the force exerted by the first SMA spring decreases such that the first bias spring and the first SMA spring move the grille towards the closed position.

In a still further embodiment, the shutter system further comprises a cold stop fixedly mounted on the panel such that the cold stop halts movement of the grille when the grille reaches the closed position.

In a yet further embodiment, the shutter system further comprises a hot stop fixedly mounted on the panel such that the hot stop halts movement of the grille when the grille reaches the open position.

In one embodiment, the shutter system further comprises a second actuator mechanism coupled to the panel and the grille and comprising a second bias spring and a second shape-memory alloy (SMA) spring, the second actuator mechanism configured to move the grill between the open position and the closed position.

In another embodiment, the first and second actuator mechanisms are coupled to the panel and the grille on opposite sides of the grille.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

In the description that follows, the disclosed shutter system is describe and illustrated in a vehicular implementation. However, this is merely an illustrative embodiment and should not be construed to limit the scope of the present disclosure. Those of ordinary skill in the art will readily understand that the disclosed shutter system is also applicable in non-vehicle implementations, such as window installations, air conditioning systems, and the like.

The present disclosure describes a shutter system that includes a shape-memory alloy (SMA) spring actuator that moves a grate to block or to open the airflow into a space depending on the ambient temperature. The shutter system further includes a hot stopper and a cold stopper to prevent over-travel of the grate.

The SMA spring actuator enables design variation by a creating modular actuator unit design and improves the parts assembly by creating a plug-type actuator unit design. The design mitigates performance degradation over many cycles by using the hot end of the actuation cycle and the hot and cold stops.

Figure 1:
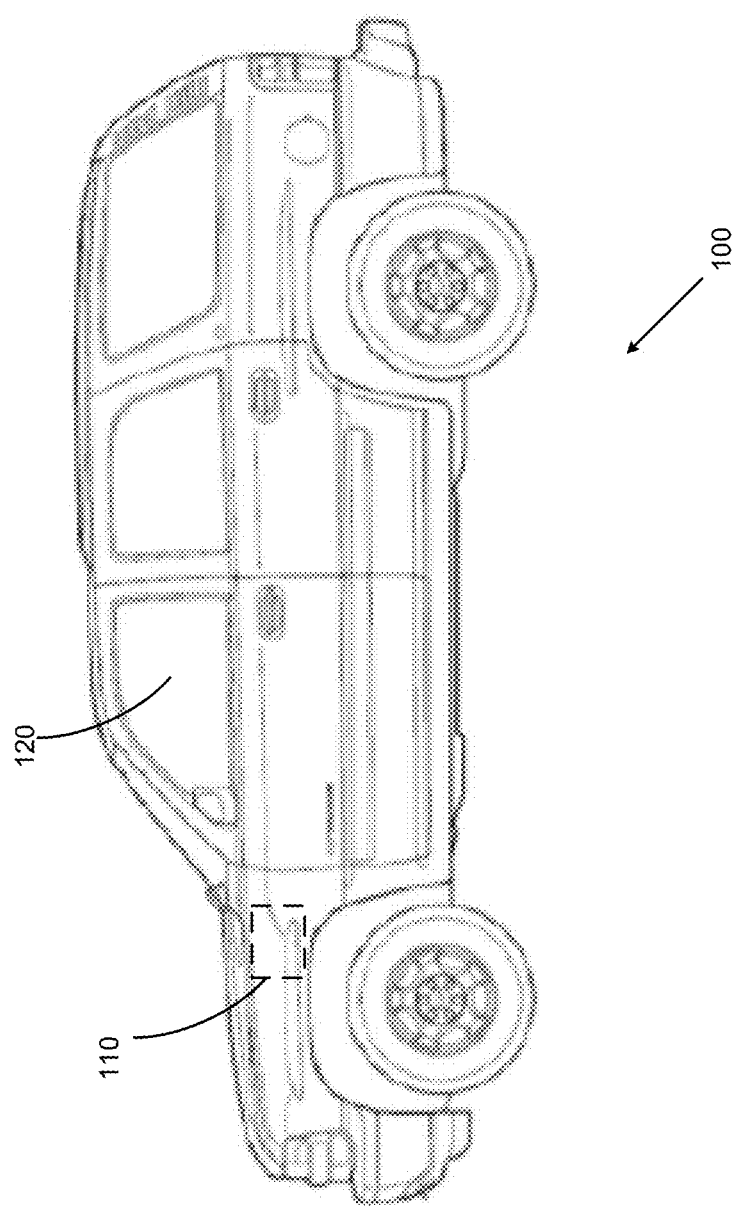
FIG. 1 illustrates a vehicle that includes one or more shutter systems according to the principles of the present disclosure.

FIG. 1 illustrates a vehicle 100 that includes one or more shutter systems 110 according to the principles of the present disclosure. The shutter system 110 is internal to the vehicle 100 and therefore appears in dotted lines. In an exemplary embodiment, a shutter system 110 may control airflow into the passenger compartment 120 based on the ambient temperature in the passenger compartment 120. Alternatively, an exemplary shutter system 110 may control airflow into the engine compartment (not shown) based on the ambient temperature in the engine compartment.

According to the principles of the present disclosure, the shutter system 100 opens and closes according to the pressure supplied by a spring actuator made from a shape-memory alloy (SMA). A shape-memory alloy is an alloy that deforms at a cooler temperature, but returns to a pre-deformed shape (or remembered shape) when heated to a warmer temperature. Other names for a shape-memory alloy include memory metal, memory alloy, smart metal, muscle wire, and smart alloy. Parts made of shape-memory alloys are lightweight, solid-state alternatives to conventional actuators, such as hydraulic, pneumatic, and electromagnetic (motor or solenoid) driven systems.

Figure 2:
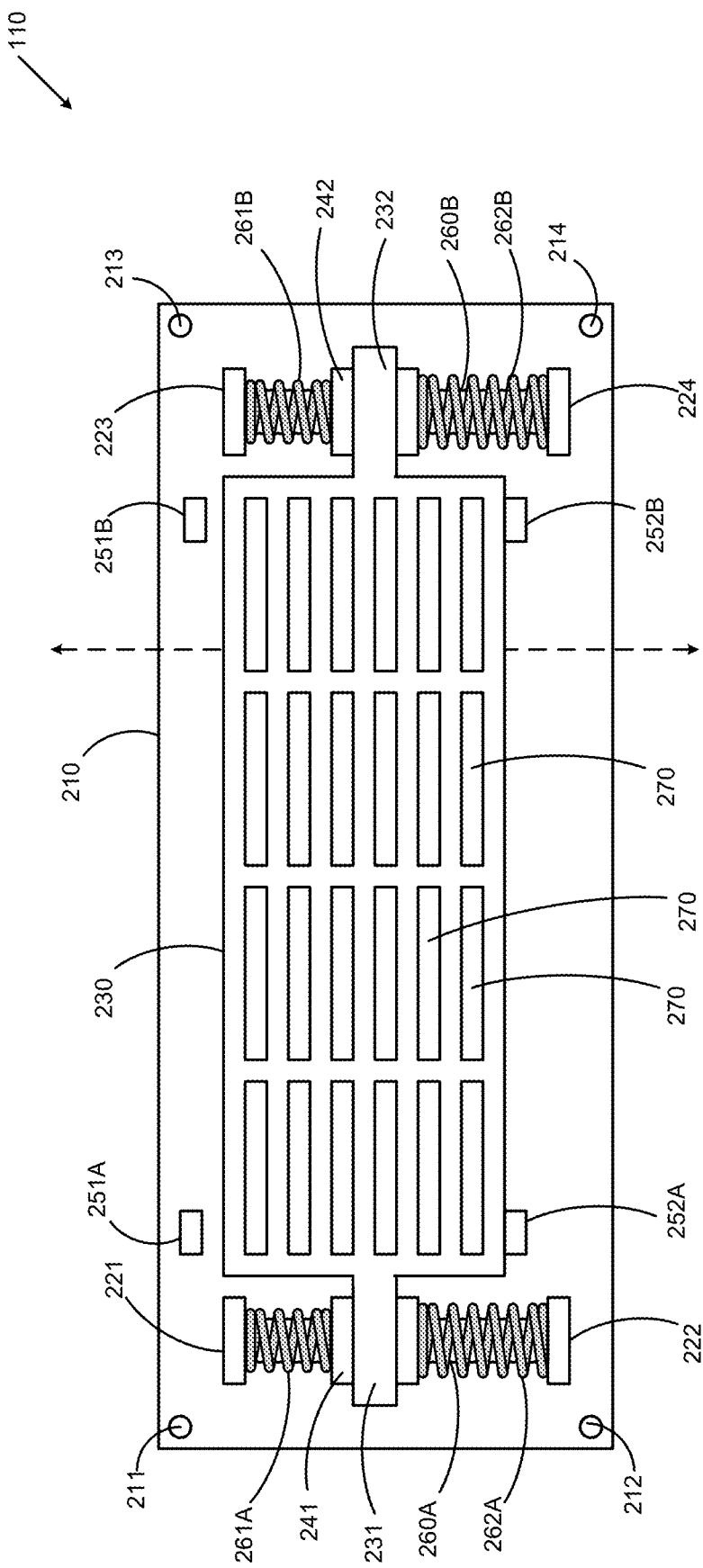
FIG. 2 illustrates an exemplary shutter system according to the principles of the present disclosure.

FIG. 2 illustrates an exemplary shutter system 110 according to the principles of the present disclosure. Shutter system 110 comprises a panel 210, which includes screw holes 211-214 that allow the panel 210 to be screwed in place over another aperture, such as the end of an air duct or other conduit. The panel 210 also includes mounting flanges 221-224, and a grille 230. The grille 230 includes a plurality of rectangular slots 270 that allow air to pass through the grille 230.

As will be explained below in detail, the vertical movement (indicated by dashed arrows) of the grille 230 allows the slots 270 to align with corresponding slots (not visible) in the panel 210 behind the grille 230. On the left side in FIG. 2, the shutter system includes a shape-memory alloy (SMA) spring 261A, a bias spring 262A, and a rail 260A that is disposed inside of the SMA spring 261A and the bias spring 262A. The rail 260A is fixedly mounted between mounting flanges 221 and 222. On the right side in FIG. 2, the shutter system includes a shape-memory alloy (SMA) spring 261B, a bias spring 262B, and a rail 260B that is disposed inside of the SMA spring 261B and the bias spring 262B. The rail 260B is fixedly mounted between mounting flanges 223 and 224.

A collar 241 is slidably mounted around the rail 260A so that the collar 241 can slide vertically on the rail 260A under pressure from the SMA spring 261A and the bias spring 262A. One end of the SMA spring 261A is pressed against the mounting flange 221 and the other end of the SMA spring 261A is pressed against the top of the collar 241. One end of the bias spring 262A is pressed against the mounting flange 222 and the other end of the bias spring 262A is pressed against the bottom of the collar 241. Since the mounting flanges 211 and 222 cannot move, the collar 241 moves vertically depending on which one of the SMA spring 261A and the bias spring 262A is exerting greater force.

A collar 242 is slidably mounted around the rail 260B so that the collar 242 can slide vertically on the rail 260B under pressure from the SMA spring 261B and the bias spring 262B. One end of the SMA spring 261B is pressed against the mounting flange 223 and the other end of the SMA spring 261B is pressed against the top of the collar 242. One end of the bias spring 262B is pressed against the mounting flange 224 and the other end of the bias spring 262B is pressed against the bottom of the collar 242. Since the mounting flanges 213 and 223 cannot move, the collar 242 moves vertically depending on which one of the SMA spring 261B and the bias spring 262B is exerting greater force.

The grille 230 is coupled to the collar 241 by a mounting arm 231 and is coupled to the collar 242 by a mounting arm 232. Thus, as the collars 241 and 242 slide vertically on the rails 260A and 260B, the grille 230 moves vertically with the collars 241 and 242. As the ambient temperature increases, the grille 230 moves downward when the combined forces of the SMA springs 261A and 261B increase and overcome the combined counteracting forces of the bias springs 262A and 262B. The downward movement of the grill 230 is stopped by the hot stops 252A and 252B. As the ambient temperature decreases, the grille 230 moves upward when the combined forces of the SMA springs 261A and 261B decrease and are overcome by the combined counteracting forces of the bias springs 262A and 262B. The upward movement of the grille 230 is stopped by the cold stops 251A and 251B. In FIG. 2, the grille 230 is in the fully open position since the grille is pressed against the hot stops 252A and 252B.

Figure 3:
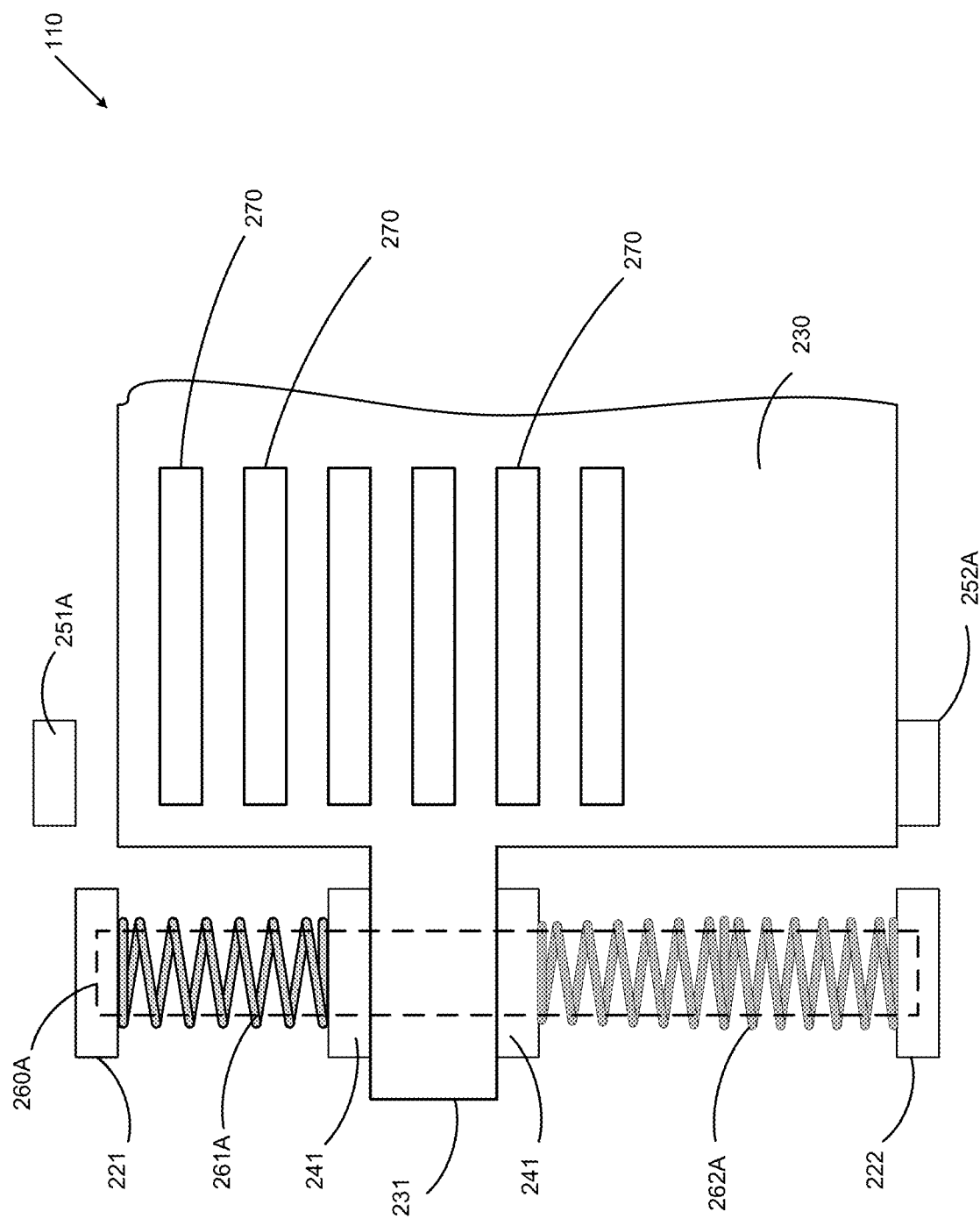
FIG. 3 illustrates an exemplary shutter system in the open position according to the principles of the present disclosure.

FIG. 3 illustrates selected parts of the exemplary shutter system 110 in the open position according to the principles of the present disclosure. For the purposes of simplicity and brevity, the description of FIG. 3 focuses on the left side of the grille 230 and omits a redundant description of the right side of the grille 230. The panel 210 is assumed to be in the background but is not shown or labeled.

The rail 260A is shown in dashed lines and is mounted between mounting flanges 221 and 222. In an exemplary embodiment, the rail 260A may be a telescoping (or extendable) metal cylinder and the ends of the rail 260A may be inserted into circular cavities in mounting flanges 221 and 222. The rail 260A passes through the collar 241, which may itself be a cylinder having an inner diameter and an outer diameter. The arm 231 is fixedly coupled to the collar 241 by threaded screws, a clamp, adhesives, or similar means of attachment.

In FIG. 3, the ambient temperature is increased and the SMA spring 261A exerts increased force and overcomes the force of the bias spring 262A. Hence, the grille 230 moves downward until hot stop 252A stops the movement of the grille 230. In this position, the slots 270 are aligned with corresponding slots in the panel 210 and cooling air flows freely through the slots 270.

Figure 4:
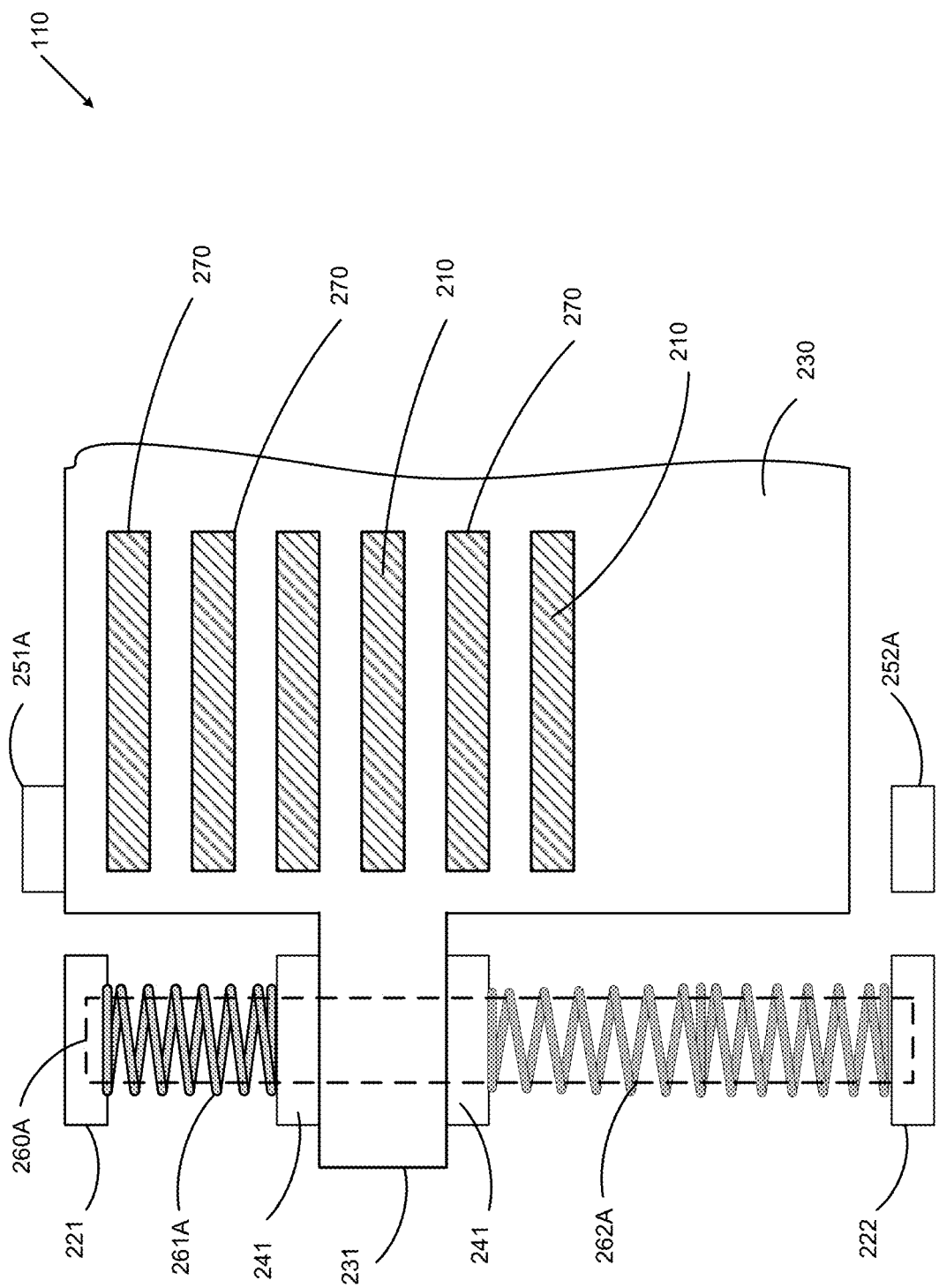
FIG. 4 illustrates an exemplary shutter system in the closed according to the principles of the present disclosure.

FIG. 4 illustrates selected parts of the exemplary shutter system 110 in the closed position according to the principles of the present disclosure. FIG. 4 is the same in most respects to FIG. 3. However, in FIG. 4, the ambient temperature is decreased. As a result, the SMA spring 261A exerts decreased force and is overcome by the force of the bias spring 262A. Hence, the grille 230 moves upward until the cold stop 251A stops the movement of the grille 230. In this position, the slots 270 are blocked by the panel 210, the surface of which appears as patterned lines behind the slots 270. As a result, the flow of cooling air is blocked.

In the embodiments described above, the grille 230 is aligned with the panel 210 such that the slots (apertures) 270 in the grille 230 are aligned with the slots (apertures) in the panel 210 when the grille 230 reaches the hot stop 252A, thereby allowing air to flow through when the ambient temperature is increased. However, this need not be the case. Simply by mounting the grille 230 on the panel 210 in a slightly different position, the slots 270 in the grille 230 may be misaligned with the slots in the panel 210 when the grille 230 reaches the hot stop 252A, thereby preventing air from flowing through when the ambient temperature is increased. In such a case, the slots 270 in the grille 230 may be aligned with the slots in the panel 210 when the grille 230 reaches the cold stop 251A so that air flows through when the temperature is decreased.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A shutter system comprising:
   a panel configured to be mounted on a conduit through which air flows, the panel having a first plurality of apertures for permitting air to flow therethrough;
   a grille movably mounted on a surface of the panel, the grille having a second plurality of apertures for permitting air to flow therethrough, wherein in an open position, the grille is aligned with the panel such that the second plurality of apertures are aligned with the first plurality of apertures to permit air to flow through both the first and second plurality of apertures and wherein in a closed position, the grille is aligned with the panel such that the second plurality of apertures are not aligned with the first plurality of apertures and air is blocked from flowing through the shutter system;
   a first actuator mechanism coupled to the panel and the grille and comprising a first bias spring and a first shape-memory alloy (SMA) spring, the first actuator mechanism configured to move the grille between the open position and the closed position; and
   a cold stop fixedly mounted on the panel such that the cold stop halts movement of the grille when the grille reaches the closed position.

2. The shutter system of claim 1, wherein the first bias spring and the first SMA spring are fixedly coupled to the panel.

3. The shutter system of claim 2, wherein the first bias spring and the first SMA spring are movably coupled to the grille.

4. The shutter system of claim 3, wherein the first bias spring and the first SMA spring move the grille relative to the panel as a force exerted by the first SMA spring changes as ambient temperature changes.

5. The shutter system of claim 4, wherein as the ambient temperature increases, the first bias spring and the first SMA spring move the grille towards the open position, and wherein as the ambient temperature decreases, the first bias spring and the first SMA spring move the grille towards the closed position.

6. The shutter system of claim 4, wherein as the ambient temperature decreases, the first bias spring and the first SMA spring move the grille towards the open position, and wherein as the ambient temperature increases, the first bias spring and the first SMA spring move the grille towards the closed position.

7. The shutter system of claim 1, further comprising a hot stop fixedly mounted on the panel such that the hot stop hafts movement of the grille when the grille reaches the open position.

8. The shutter system of claim 1, further comprising a second actuator mechanism coupled to the panel and the grille and comprising a second bias spring and a second shape-memory alloy (SMA) spring, the second actuator mechanism configured to move the grille between the open position and the closed position.

9. The shutter system of claim 8, wherein the first and second actuator mechanisms are coupled to the panel and the grille on opposite sides of the grille.

10. A vehicle vent system configured to control airflow into a passenger compartment of a vehicle, the vehicle vent system comprising:
   a panel configured to be mounted on a conduit in the vehicle through which air flows, the panel having a first plurality of apertures for permitting air to flow therethrough and into the passenger compartment;
   a grille movably mounted on a surface of the panel, the grille having a second plurality of apertures for permitting air to flow therethrough, wherein in an open position, the grille is aligned with the panel such that the second plurality of apertures are aligned with the first plurality of apertures to permit air to flow through both the first and second plurality of apertures and wherein in a closed position, the grille is aligned with the panel such that the second plurality of apertures are not aligned with the first plurality of apertures and air is blocked from flowing through the vehicle vent system;
   a first actuator mechanism coupled to the panel and the grille and comprising a first bias spring and a first shape-memory alloy (SMA) spring, the first actuator mechanism configured to move the grille between the open position and the closed position; and a cold stop fixedly mounted on the panel such that the cold stop halts movement of the grille when the grille reaches the closed position.

11. The vehicle vent system of claim 10, wherein the first bias spring and the first SMA spring are fixedly coupled to the panel.

12. The vehicle vent system of claim 11, wherein the first bias spring and the first SMA spring are movably coupled to the grille.

13. The vehicle vent system of claim 12, wherein the first bias spring and the first SMA spring move the grille relative to the panel as a force exerted by the first SMA spring changes as ambient temperature changes.

14. The vehicle vent system of claim 13, wherein as the ambient temperature increases, the first bias spring and the first SMA spring move the grille towards the open position, and wherein as the ambient temperature decreases, the first bias spring and the first SMA spring move the grille towards the closed position.

15. The vehicle vent system of claim 13, wherein as the ambient temperature decreases, the first bias spring and the first SMA spring move the grille towards the open position, and wherein as the ambient temperature increases, the first bias spring and the first SMA spring move the grille towards the closed position.

16. The vehicle vent system of claim 10, further comprising a hot stop fixedly mounted on the panel such that the hot stop halts movement of the grille when the grille reaches the open position.

17. The vehicle vent system of claim 10, further comprising a second actuator mechanism coupled to the panel and the grille and comprising a second bias spring and a second shape-memory alloy (SMA) spring, the second actuator mechanism configured to move the grille between the open position and the closed position.

18. The vehicle vent system of claim 17, wherein the first and second actuator mechanisms are coupled to the panel and the grille on opposite sides of the grille.

19. A shutter system comprising:
a panel configured to be mounted on a conduit through which air flows, the panel having a first plurality of apertures for permitting air to flow therethrough;
a grille movably mounted on a surface of the panel, the grille having a second plurality of apertures for permitting air to flow therethrough, wherein in an open position, the grille is aligned with the panel such that the second plurality of apertures are aligned with the first plurality of apertures to permit air to flow through both the first and second plurality of apertures and wherein in a closed position, the grille is aligned with the panel such that the second plurality of apertures are not aligned with the first plurality of apertures and air is blocked from flowing through the shutter system;
a first actuator mechanism coupled to the panel and the grille and comprising a first bias spring and a first shape-memory alloy (SMA) spring, the first actuator mechanism configured to move the grille between the open position and the closed position; and
a second actuator mechanism coupled to the panel and the grille and comprising a second bias spring and a second shape-memory alloy (SMA) spring, the second actuator mechanism configured to move the grille between the open position and the closed position.

20. A vehicle vent system configured to control airflow into a passenger compartment of a vehicle, the vehicle vent system comprising:
a panel configured to be mounted on a conduit in the vehicle through which air flows, the panel having a first plurality of apertures for permitting air to flow therethrough and into the passenger compartment;
a grille movably mounted on a surface of the panel, the grille having a second plurality of apertures for permitting air to flow therethrough, wherein in an open position, the grille is aligned with the panel such that the second plurality of apertures are aligned with the first plurality of apertures to permit air to flow through both the first and second plurality of apertures and wherein in a closed position, the grille is aligned with the panel such that the second plurality of apertures are not aligned with the first plurality of apertures and air is blocked from flowing through the vehicle vent system;
a first actuator mechanism coupled to the panel and the grille and comprising a first bias spring and a first shape-memory alloy (SMA) spring, the first actuator mechanism configured to move the grille between the open position and the closed position; and
a second actuator mechanism coupled to the panel and the grille and comprising a second bias spring and a second shape-memory alloy (SMA) spring, the second actuator mechanism configured to move the grille between the open position and the closed position.

* * * * *